US005234735A

United States Patent [19]

Baker et al.

[11] Patent Number: 5,234,735

[45] Date of Patent: Aug. 10, 1993

[54] COMPOSITE RESEALABLE OUTSERT

[75] Inventors: Byron L. Baker, York; Marilyn Hill, Marietta, both of Pa.

[73] Assignee: UARCO Incorporated, Barrington, Ill.

[21] Appl. No.: 848,040

[22] Filed: Mar. 9, 1992

[51] Int. Cl.[5] .......... B32B 7/06

[52] U.S. Cl. .......... 428/40; 428/126; 428/194; 428/198; 428/200; 428/201; 283/81; 283/101; 40/638; 40/306

[58] Field of Search .......... 428/40, 126, 200, 201, 428/198, 194; 283/81, 101; 40/638, 306

[56] References Cited

U.S. PATENT DOCUMENTS 3,938,659 2/1976 Wardwell .......... 206/439
4,323,608 4/1982 Denny et al. .......... 428/43
4,991,878 2/1991 Cowan et al. .......... 283/81
5,074,595 12/1991 Hill et al. .......... 283/81

*Primary Examiner*—Alexander S. Thomas
*Attorney, Agent, or Firm*—Samuel M. Learned, Jr.

[57] ABSTRACT

A composite resealable outsert and method for making the same, which produces a pressure sensitive applied resealable and clear laminate protected multi-fold outsert that provides product manufacturers with a convenient and economical device to satisfactorily meet increasing requirements for accommodating close retained association of previously printed product use and precautionary information outserts directly with the product by affixment and re-use protected attachment thereof either to the product container or the product itself rather than by the otherwise usual and typical method of simple loosely inserted outsert deposit within the product container.

2 Claims, 2 Drawing Sheets

COMPOSITE RESEALABLE OUTSERT

BACKGROUND OF THE INVENTION

The present invention relates to a composite resealable outsert which is fabricated from the combination of a previously printed loose folded outsert with an adhesive backing and a resealable protective overlaminate encapsulation to thereby produce a relatively permanent reuseable product use and precautionary information outsert which is applied directly to the product container or product itself, and thus enhance the intended usefulness and effectiveness thereof. The disclosure herein also teaches a method for making the composite resealable outsert.

With an advent of more stringent instructional and directional use requirements as regards various consumer products, exemplary of which would be a broad spectrum ranging from over-the-counter health substances to small household appliances and power tools, there became an increasing need to provide extended text use instruction and precautionary warning materials, which primarily took the form of folded outserts loosely inserted within the product container, or in the case of medicinal products being removably secured to the product container by means of a rubber band or the like. A main drawback limiting the foregoing type of outsert inclusion with a product was that the outsert and product frequently became separated so that the desired information did not stay with the product as an available reference to the user thereof for the duration of product use.

The next step was to provide a folded outsert that attached directly to either the product of product container by affixment thereto with a self-adhesive backing or the like. And thereafter, in order to enhance the outsert durability and useful life, some sort of protective overlaminate film was provided with a suitable release and resealing tab means so that the outsert could be refolded and protectively retained with the product. It is this latter type of product applied resealable protected outsert which the current invention functionally provides and is in current use as exemplified by U.S. Pat. No. 4,323,608 to Denny et al dated Apr. 6, 1982, and U.S. Pat. No. 5,074,595 to Hill et al dated Dec. 24, 1991, which is Assigned to and owned by Assignee herein.

The structure and method whereby the composite resealable outsert hereof is fabricated is likened unto but distinguished from that as taught by Wardwell in U.S. Pat. No. 3,938,659 dated Feb. 17, 1976, for a totally frangible bonding system in providing a protective pod for a sterilized item. However, in the art of providing a composite resealable outsert as a combination of previously printed product use and precautionary information outserts with after-applied pressure sensitive adhesive backing and a clear overlaminate resealable protective film, with partially frangible component features, by the method hereof, the instant invention is new and novel as hereinafter more fully detailed and described.

SUMMARY OF THE INVENTION

It is the principal object of the present invention to provide a composite resealable outsert comprised of a separately produced multi-folded outsert which is assembled in register to a pressure sensitive adhesively affixable supporting base member, all of which is then overlaminated with a clear resealable protective film.

It is another object of the present invention to provide a product manufacturer with the economies of an assembly method whereby the composite resealable outsert hereof is commerically produced by salvaging and employing the manufacturer's previously printed multi-folded outserts which under currently acceptable outsert-to-product association practices would otherwise go unused.

It is also an object of the present invention to provide the product manufacturer with a convenient and satisfactory means to meet increasing requirements for accommodating close retained association of previously printed product use and precautionary information with the product by affixment and re-use protected attachment thereof, by means of the composite resealable outsert hereof, either directly to the product container or product per se rather than by the typical and less satisfactory method of simple loosely inserted association therewith.

It is an additional object of the present invention to provide a composite resealable outsert that incorporates an outer cover clear protective overlaminate layer which is sufficiently adequate in both strength and durability to prevent damage to the inner contained outsert through subsequent and repeated opening and resealing cycles of use thereof.

The foregoing, and other objects hereof, will be readily evident upon a study of the following specification and accompanying drawings comprising a part thereof.

DETAILED DESCRIPTION OF THE INVENTION

Figure 1:
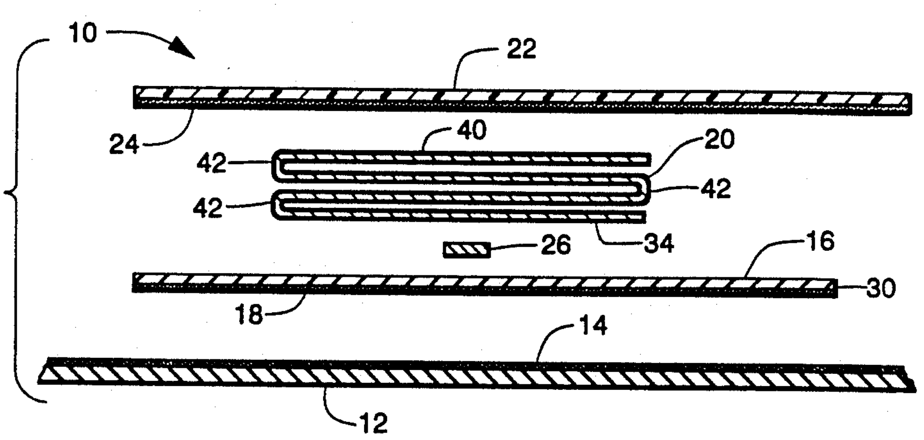
FIG. 1 is an exploded pre-assembly cross sectional view of the component parts, and the relative spatial assembly relationships thereof, of the preferred embodiment version of the composite resealable outsert comprising the instant invention.

Referring to FIG. 1, the composite resealable outsert structure 10 of instant invention is illustrated in an exploded pre-assembly cross sectional view wherein the various laminate layer component parts comprising the same are shown, being from the bottom up the carrier liner backing paper 12 to which is applied a silicone release medium 14 in combination functioning to support and carry the remainder of the outsert structure prior to removal and application thereof to a use surface, then the film or paper base 16 of the outsert 10 structure to the underside of which is applied a layer of suitable outsert application pressure-sensitive adhesive 18 and the upper side of which base 16 serves to support the multi-fold outsert 20, and the outsert overlaminate protective film 22 having applied to the underside thereof an overlaminate pressure-sensitive adhesive 24, wherein there is nothing per se new in the rather typical outsert structure thus far shown. However, if one is to take a multi-fold outsert 20 as an individual and separate component from another source as is herein the case, and mechanically combine it with the remaining component parts as shown in FIG. 1 by automated machine and manufacturing processes to produce commercial quantities of assembled composite resealable outserts 10 as shown in FIG. 6, then there must be provided a suitable temporary means for spotting and holding the outsert 20 to the base 16 during machine forwarding and application of the overlaminate protective film 22, and this is accomplished through the application and use of a frangible hot melt adhesive spot 26 by the technique hereof to be hereinafter more fully illustrated and explained.

Referring now sequentially to FIGS. 2–6 to explain in greater detail the unique structure and method of making the composite resealable outsert 10 hereof, wherein it will be understood that the carrier liner backing paper 12 is actually a web upon which is mechanically imposed by the instant converting process a repetitive sequential plurality of like individual composite resealable outserts 10, but for facilitated illustration and ease of explanation only one such composite resealable outsert 10 is shown upon the carrier liner backing paper 12 web as illustrated in FIGS. 1–6 and 10–11.

Figure 2:
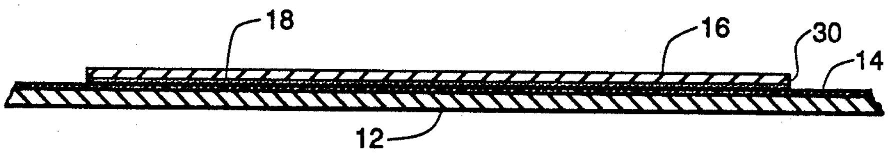
FIGS. 2–6 illustrate the sequential steps of the method for making the preferred embodiment version of the composite resealable outsert of instant invention.
Figure 3:
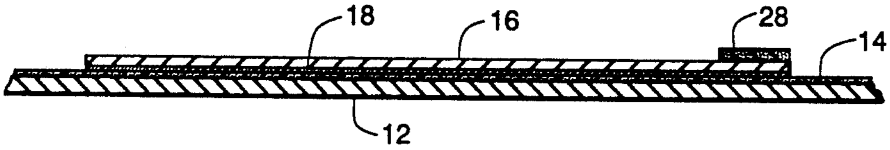

The view shown in FIG. 2 illustrates the first assembly step in converting a loose multi-fold outsert to a composite resealable outsert, and consists of imposing in sequential register the outsert application pressure-sensitive adhesive 18 lined base 16 upon the silicone release medium 14 coated carrier liner backing paper 12 web, a manufacturing process step well known and established in conventional and current label making art. Secondly, as illustrated in FIG. 3, a release-reseal coating strip 28 is imprinted upon the outsert overlaminate protective film reseal tab end 30 of the base 16, which provides for facilitated release and reseal of the outsert overlaminate protective film reseal tab 32 to the base 16 upon opening and reclosing the composite resealable outsert 10 by mechanically reducing the adhesion effect of the overlaminate pressure-sensitive adhesive 24 film at that point and therefore also reducing that amount of manual force otherwise necessary to lift and reseal the tab 32.

Figure 4:
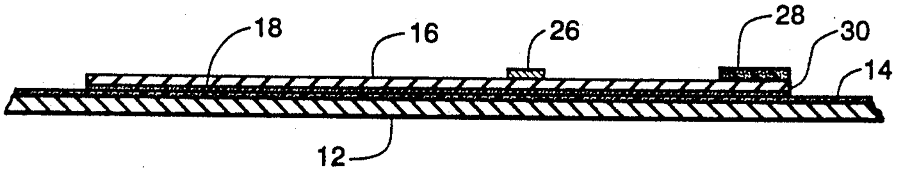
Figure 5:
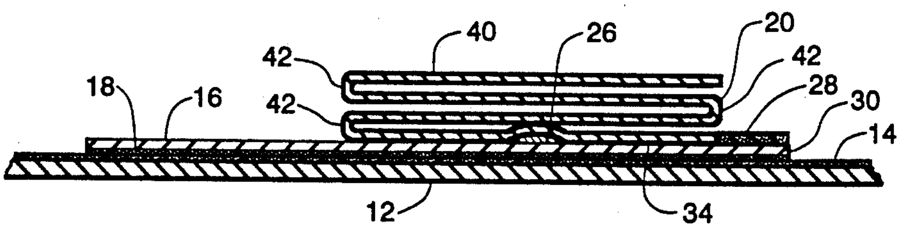
Figure 6:
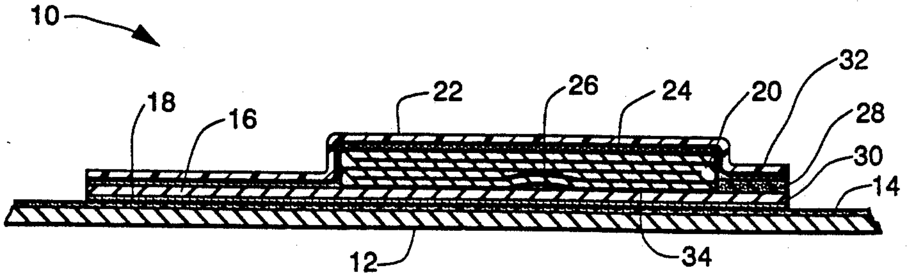

The views shown in FIGS. 4 and 5 illustrate first in FIG. 4 the deposit of a frangible hot melt adhesive spot 26 at a registered position upon the base 16 immediately prior to and prepatory for the registered mechanical placement and temporary holding thereby of the multi-fold outsert 20, and secondly in FIG. 5 the registered mechanical placement of the multi-fold outsert 20 upon the base 16 and temporary positional holding thereof by the frangible hot melt adhesive spot 26 during further machine forwarding and the subsequent processing operation of positioning and placement of the outsert overlaminate protective film 22 to the composite resealable outsert 10 structure as shown in FIG. 6.

The view shown in FIG. 6 illustrates the completed mechanical conversion to a composite resealable outsert 10 upon the carrier liner backing paper 12 web by placement of the outsert overlaminate protective film 22 thereto, as prepared by the use of a loose multi-fold outsert 20 and the method hereof. It will be noted that when the composite resealable outsert 10 is opened for use, the frangible hot melt adhesive spot 26 fractures with normal opening force and thereby releases the bottom sheet 34 of the outsert 20 from the base 16 for reference and reading use.

Figure 7:
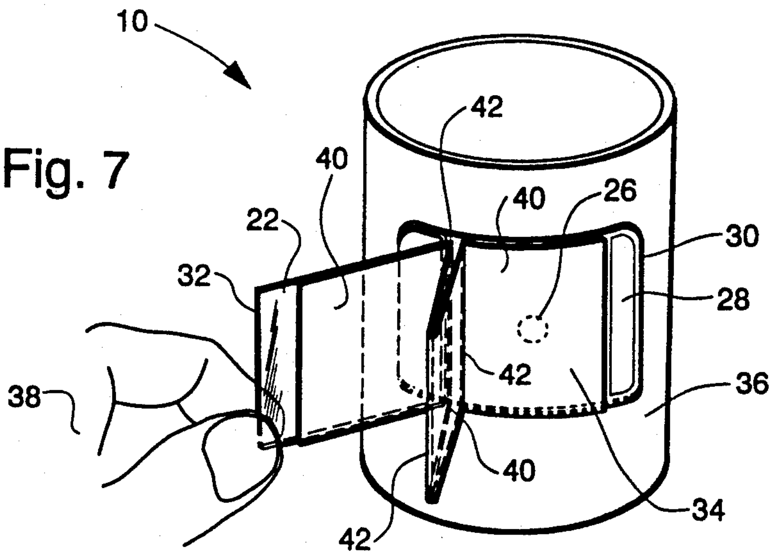
FIG. 7 is an illustration of exemplary use employment of the composite resealable outsert upon a typical product container.
Figure 8:
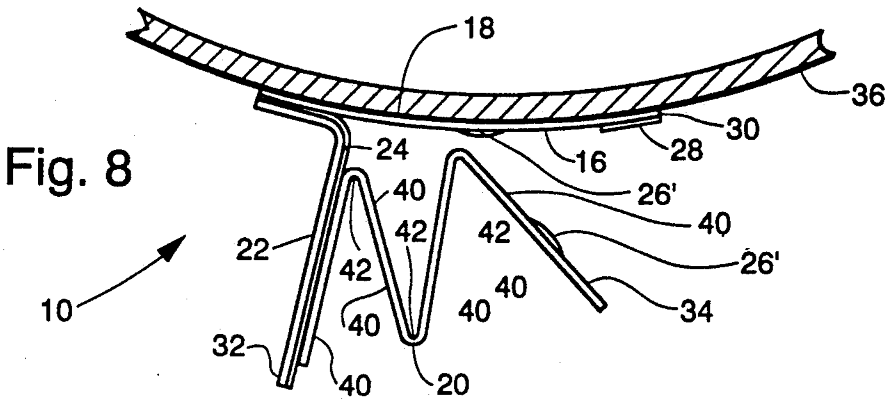
FIG. 8 is another view of exemplary use employment of the composite resealable outsert hereof.

Considering now the view shown in FIG. 7, which illustrates an exemplary use employment of the composite resealable outsert 10 hereof as applied to a typical product container 36, and the method of utilizing the same. As shown, the user 38 manually grasps the outsert overlaminate protective film reseal tab 32 and lifting outwardly opens the outsert overlaminate protective film 22 thereby unfolding the outsert 20 multi-fold sheets 40. As one proceeds with the opening, and slightly beyond the outsert overlaminate protective position 22 as shown in FIG. 7, the frangible hot melt adhesive spot 26 will normally have sufficient delaminating force exerted thereon to cause an internal planar rupture thereof which is shown as separated hot melt adhesive spot 26', and thereby release the bottom sheet 34 as shown in FIg. 8 so that all sheets 40 of the outsert 20 are made available for reference use. A protective reclosing and resealing of the composite outsert 10 is simply accomplished by a manual refolding of the multi-fold sheets 40 along the original fold lines 42, and compressively rejoining the reseal tab 32 to the release-reseal coating strip 28.

Figure 9:
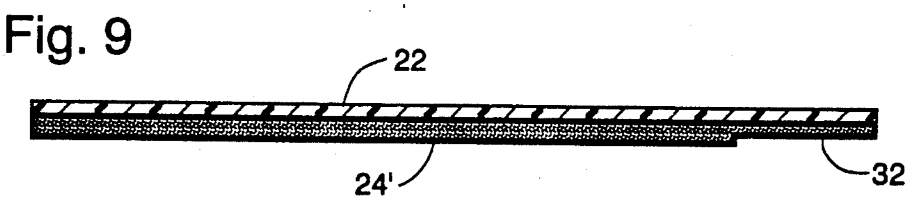
FIGS. 9–11 illustrate the method for making an alternate embodiment version of the composite resealable outsert hereof.
Figure 10:
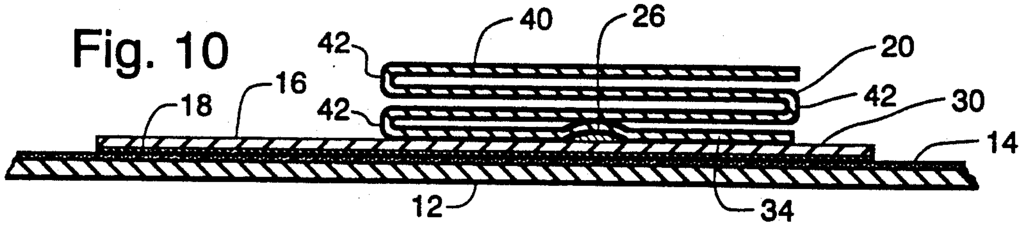
Figure 11:
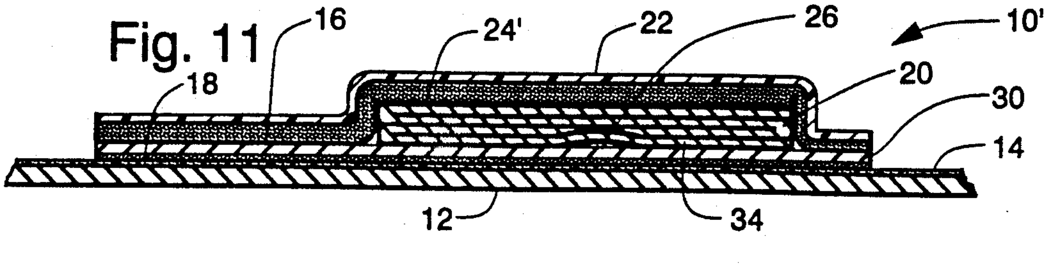

Considering lastly the alternate composite resealable outsert 10' and the method of assembly thereof as illustrated in FIGS. 9–11, in which case the outsert overlaminate protective film 22 is applied with a differential thickness overlaminate pressure-sensitive adhesive 24' which provides a thinner adhesive layer on the outsert overlaminate protective film reseal tab 32 thereby eliminating any need for use of a release-reseal coating strip in the reseal tab area 30 in order to achieve a differential ease of opening result as earlier described. Otherwise, methodology of the converting process employing use of a frangible hot melt adhesive spot 26 in commercially producing and thereafter using an alternate composite resealable outsert 10', as fabricated from a separate multi-fold outsert 20 as shown in FIGS. 10 and 11, is technically and functionally the same as was previously described for making and using the preferred embodiment composite resealable outsert 10.

Although the invention has been herein shown and described in what is conceived to be the most practical and preferred embodiment, it is recognized that departures may be made therefrom within the scope thereof, which is not to be limited to the specific details disclosed herein but is to be accorded the full scope of the claims so as to embrace any and all equivalent composite resealable outsert structures and methods for making the same.

I claim:

1. A composite resealable outsert comprising in combination, a carrier liner backing paper having applied to the upper side thereof a silicone release medium, a film base having applied to the underside thereof an outsert application pressure-sensitive adhesive to detachably bond said film base to said silicone release medium, a release-reseal coating strip applied along one upward side of said film base, a frangible adhesive spot applied centrally intermediate the upward side of said film base, a multi-fold outsert supportably disposed upon said upward side of said film base and positionally adhered thereto temporarily by said frangible adhesive spot, and an outsert overlaminate protective film having applied to the underside thereof an overlaminate pressure-sensitive adhesive to adhesively engage and laminately bond said outsert overlaminate protective film to an upward side opposite said one upward side of said film base across the top most sheet of said multi-fold outsert and to said release-reseal coating strip upon said film base to provided an opening and resealing capability for said composite resealable outsert and fracture said frangible adhesive spot upon a lifting of said outsert overlaminate protective film in the opening of said multi-fold outsert.

2. The composite resealable outsert according to claim 1 wherein said frangible spot is a hot melt adhesive.

* * * * *